US011567646B1

(12) United States Patent
Deore et al.

(10) Patent No.: US 11,567,646 B1
(45) Date of Patent: Jan. 31, 2023

(54) RESIZING A LOGON SCREEN OR OTHER USER INTERFACE (UI) ELEMENTS PRIOR TO LOGIN

(71) Applicant: VMware, Inc., Palo Alto, CA (US)

(72) Inventors: Charansing Deore, Pleasanton, CA (US); Yuan Ma, Beijing (CN); Baochen Wang, Beijing (CN); Jingxiao Xu, Beijing (CN); Zhi Lin, Beijing (CN)

(73) Assignee: VMWARE, INC., Palo Alto, CA (US)

(*) Notice: Subject to any disclaimer, the term of this patent is extended or adjusted under 35 U.S.C. 154(b) by 0 days.

(21) Appl. No.: 17/685,395

(22) Filed: Mar. 3, 2022

(30) Foreign Application Priority Data

Jan. 13, 2022 (WO) ................ PCT/CN2022/071774

(51) Int. Cl.
*G06F 3/14* (2006.01)
*G06F 9/451* (2018.01)
*G06F 3/04845* (2022.01)

(52) U.S. Cl.
CPC ............ *G06F 3/04845* (2013.01); *G06F 3/14* (2013.01); *G06F 9/452* (2018.02)

(58) Field of Classification Search
None
See application file for complete search history.

(56) References Cited

U.S. PATENT DOCUMENTS

| 6,571,245 B2* | 5/2003 | Huang | G06F 16/9535 709/248 |
| 9,686,323 B1* | 6/2017 | Helter | H04L 65/1096 |
| 2003/0130957 A1* | 7/2003 | Best | G06Q 20/4012 705/72 |
| 2005/0108654 A1* | 5/2005 | Gopalraj | G06F 21/31 715/791 |
| 2011/0219331 A1* | 9/2011 | DeLuca | G06F 3/048 715/810 |
| 2012/0226742 A1* | 9/2012 | Momchilov | G06F 3/1454 709/203 |
| 2014/0026057 A1* | 1/2014 | Kimpton | G06F 9/451 715/733 |
| 2017/0277408 A1* | 9/2017 | Gross | G06F 3/1454 |
| 2020/0142571 A1* | 5/2020 | Gross | G06F 3/1454 |
| 2021/0152626 A1* | 5/2021 | Momchilov | G09G 5/14 |

OTHER PUBLICATIONS

David Ball, "Why can't I click OK?"—Resizing the Citrix Logon Window, available at <URL: https://ballblog.net/2016/04/21/why-cant-i-click-ok-resizing-the-citrix-logon-window/>, Apr. 21, 2016, 5 pages.

* cited by examiner

*Primary Examiner* — Henry Orr
(74) *Attorney, Agent, or Firm* — Su IP Consulting

(57) ABSTRACT

A logon screen and a user interface (UI) element used in connection with a remote desktop are resized, by presenting the logon screen and UI element in a connection/viewing window having a size that has been reduced to be smaller than the topology of a display screen of a user device. After the logon process is completed, a window of the remote desktop and/or a window of an application installed on the remote desktop can be sized/resized to a larger size for use by the user.

21 Claims, 6 Drawing Sheets

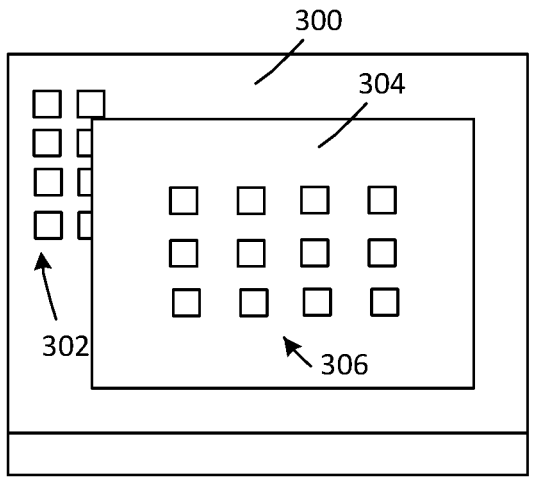
Fig. 3A
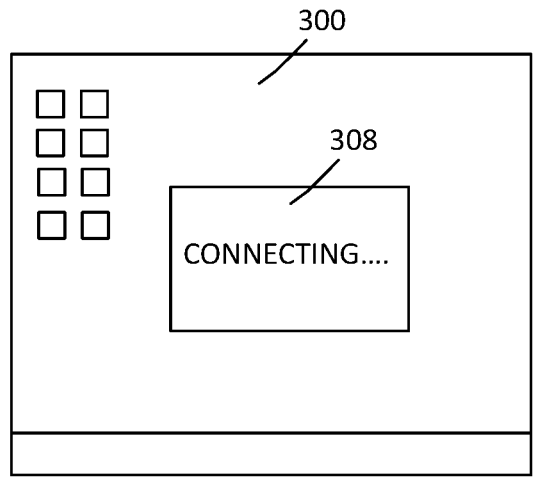
Fig. 3B
Fig. 3C
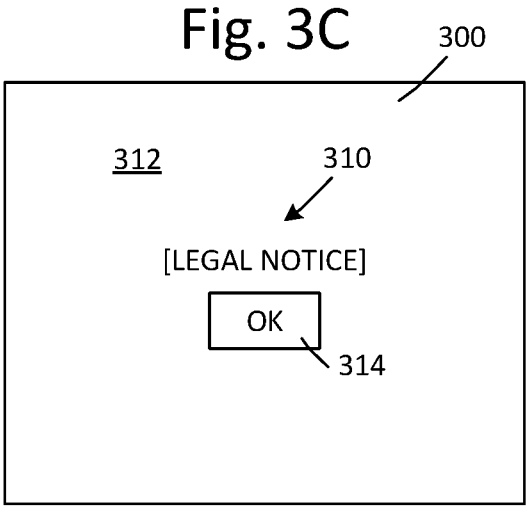
Fig. 3D
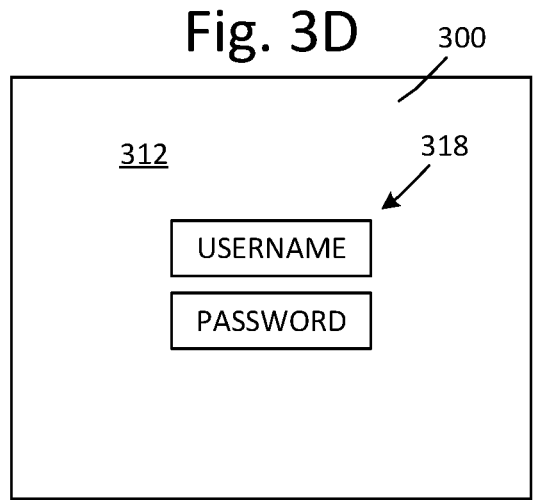
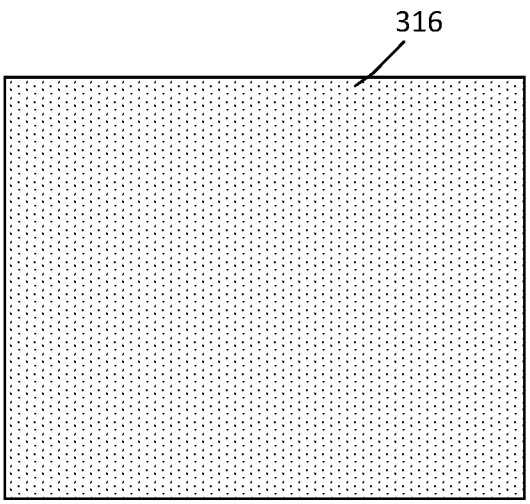
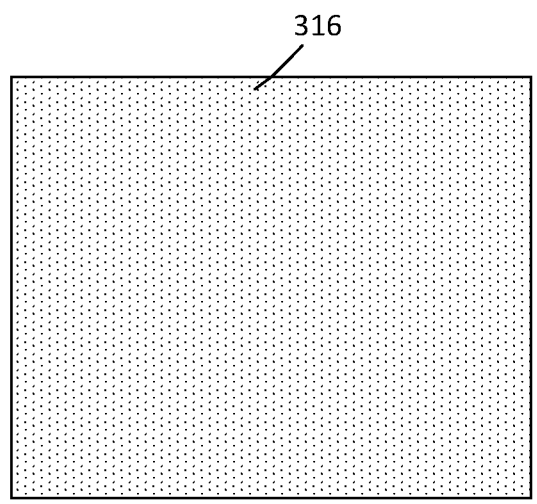

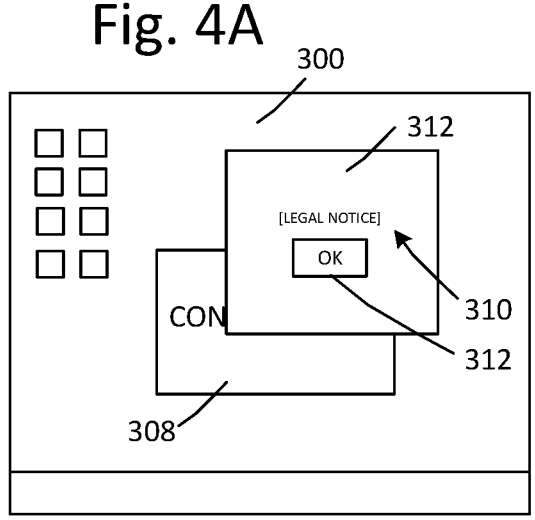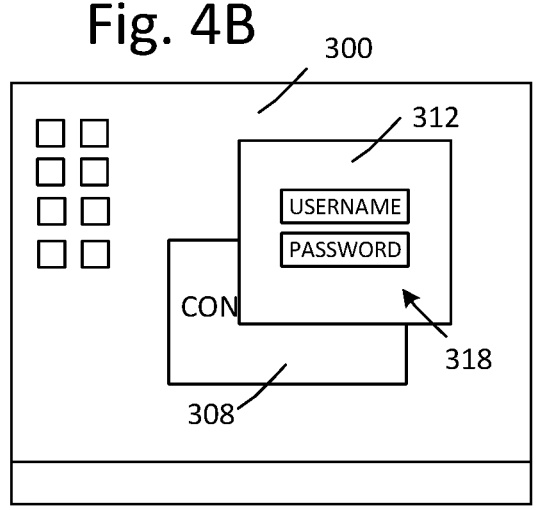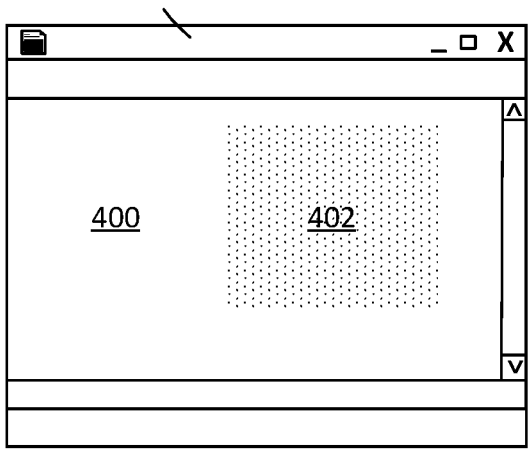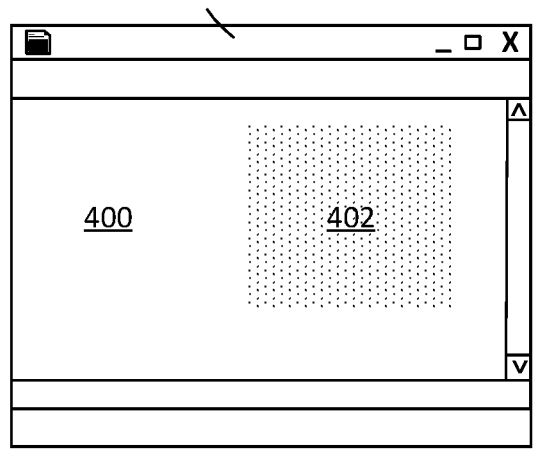
Fig. 4A
Fig. 4B
Fig. 4C

RESIZING A LOGON SCREEN OR OTHER USER INTERFACE (UI) ELEMENTS PRIOR TO LOGIN

CROSS-REFERENCE TO RELATED APPLICATION

The present application claims the benefit of Patent Cooperation Treaty (PCT) Application No. PCT/CN2022/071774, filed Jan. 13, 2022, which is incorporated herein by reference.

BACKGROUND

Unless otherwise indicated herein, the approaches described in this section are not admitted to be prior art by inclusion in this section.

Virtualization allows the abstraction and pooling of hardware resources to support virtual machines in a software-defined networking (SDN) environment, such as a software-defined data center (SDDC). For example, through server virtualization, virtualized computing instances such as virtual machines (VMs) running different operating systems (OSs) may be supported by the same physical machine (e.g., referred to as a host). Each virtual machine is generally provisioned with virtual resources to run an operating system and applications. The virtual resources in a virtualized computing environment may include central processing unit (CPU) resources, memory resources, storage resources, network resources, etc.

One example use of a virtualized computing environment is for a virtual desktop infrastructure (VDI) implementation, which is a type of desktop virtualization that allows a remote desktop to run on VMs that are provided by a hypervisor on a host. A user/client uses the operating system (OS) and applications (which reside and execute at the VM) via an endpoint device (client device) of the user, just as if the OS/applications were actually running locally on the endpoint device, when in reality the OS/applications are running on the remote desktop.

However, the logon user interface (UI), such as for the OS, of the remote desktop, as well as other UI elements, such as an accompanying legal notice, etc. displayed by the logon UI, often do not provide a good user experience. For example, the legal notice or other UI element(s) may occupy the entire topology of a display screen of the client device, and does not disappear until after the user activates an acknowledgement (such as by clicking on an OK button) that is being prompted in the UI. The user is generally unable to view/operate other applications/tools on the local desktop of the client device, while the UI element(s) are occupying the entire topology of the display screen.

BRIEF DESCRIPTION OF DRAWINGS

FIGS. 3A-3D are diagrams depicting example screenshots in connection with a logon screen and a UI element;

FIGS. 4A-4C are diagrams depicting example screenshots in connection with resizing a logon screen and a UI element.

DETAILED DESCRIPTION

Figure 1:
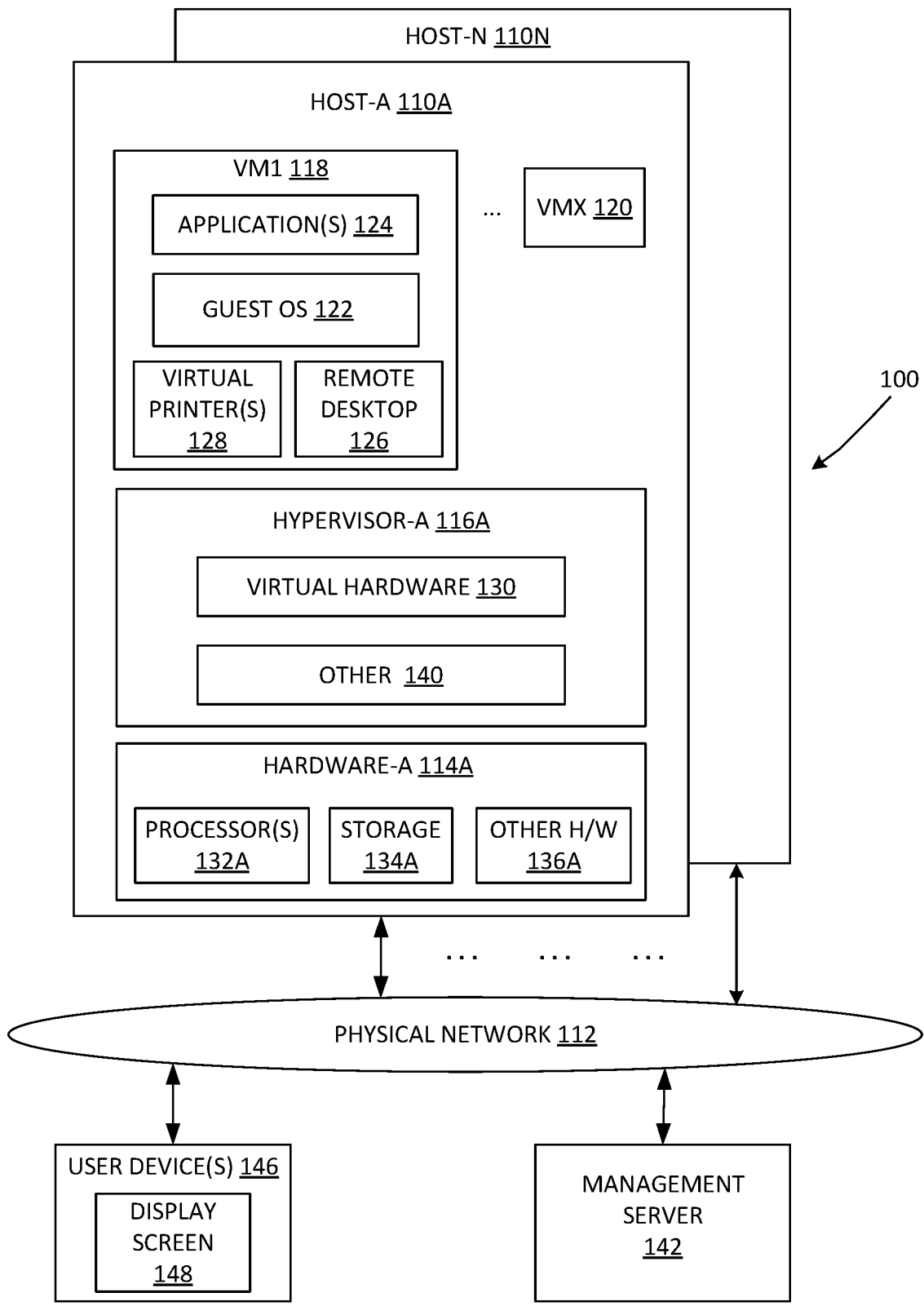
FIG. 1 is a schematic diagram illustrating an example virtualized computing environment that can implement a virtual desktop infrastructure (VDI) with capability to resize a logon screen or a UI element prior to login.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. The aspects of the present disclosure, as generally described herein, and illustrated in the drawings, can be arranged, substituted, combined, and designed in a wide variety of different configurations, all of which are explicitly contemplated herein.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, such feature, structure, or characteristic may be effected in connection with other embodiments whether or not explicitly described.

The present disclosure addresses drawbacks associated with existing remote desktop systems/techniques, wherein a logon screen (such as an operating system (OS) logon screen and/or other type of logon screen or logon UI) occupies an entire topology (e.g., real estate) of a display screen of a user device and also other display screen(s) connected to the user device, thereby preventing a user from viewing or using applications/files that are present (e.g., installed, running, stored, etc.) at the user device. The present disclosure also addresses drawbacks associated with existing remote desktop systems/techniques, wherein a user interface element presented via the logon screen (e.g., a legal notice or other acknowledgement message) also occupies the entire topology of the display screen, thereby also preventing a user from viewing or using applications/files at the user device.

The present disclosure addresses the above and other drawbacks by providing capability to resize a logon screen and/or other UI element(s), such as those that involve an activation of an acknowledgement in order to be removed from being displayed, that would otherwise occupy all or most of the entire topology of a display screen. This may be accomplished by presenting the logon screen and UI element(s) in a connection/viewing window having a size that has been reduced to be smaller than the topology of the display screen of the user device. After the logon process is completed, a window of a remote desktop (e.g., a remote desktop UI) and/or a window of an application installed on the remote desktop (e.g., an application UI) can be sized/resized to a larger size for use by the user.

For the purposes of explanation and illustration, and for convenience, such UI element(s) will be described at times throughout this disclosure in the context of being a legal notice having an acknowledgement that is being prompted (e.g., an OK button). It is understood that such a legal notice is only one example of the UI elements that can be resized etc. in the manner described hereinafter. The disclosed techniques may be applied in other embodiments to other types of UI elements that occupy most/all of the topology of a display screen in a manner that limits the user's capability to use other applications/tools of a client device while the UI element(s) is being displayed. Further, such UI elements may or may not necessarily provide an acknowledgement that is being prompted and that needs to be activated in order to remove the UI element from the display screen. Examples of such UI elements may include, for example and alternatively/additionally to a legal notice, a welcome page, a menu, a banner, an advertisement, a window, a logo, animation, text, or other type of graphical element or content that may be rendered on a display screen.

User Interfaces (UI) with a Logon Screen and UI Element(s)

The foregoing and other features may be better understood by initially referring to FIGS. 3A-3D and FIGS. 4A-4C. Referring first to FIGS. 3A-3D, which are diagrams depicting example screenshots in connection with a logon screen and UI element such as a legal notice, a user at a user device (e.g., a client/endpoint device) wishes to connect to a remote desktop so as to use an application (such as a remote desktop service host (RDSH) application) installed at the remote desktop configured/running at a remote host.

FIG. 3A shows a local desktop 300 rendered on a display screen of the user device. A plurality of icons 302 of local applications (e.g., applications installed at the user device) and/or file(s) of these local applications may be rendered on the local desktop 300. Client software (e.g., a service, application, code, module, engine, etc., all of which may be generally referred to herein as a client service or client) may be installed at the user device, so as to operate as a VDI client-side component to cooperate with a VDI agent-side component (e.g., agent software), for purposes of connecting the user device to the remote host so as to enable the user to use a remote desktop and its applications from the user device. Examples of such agent software and client software are the Horizon agent and the Horizon client, respectively, available from VMware, Inc. of Palo Alto, Calif.

FIG. 3A shows that the client service (e.g., the Horizon client) has been launched at the user device, so as to present a display or user interface (UI) 304 showing a plurality of icons 306 of RDSH applications that are installed at the remote desktop, and one or more of these RDSH applications can be selected by the user for using via the user device. When the user connects to an RDSH application from the Horizon client (e.g., by clicking one of the corresponding icons 306 in the UI 304 to initiate a connection to the remote desktop at the agent side), the client sets the topology of all display screens at the user device to the full available resolution or screen size, and such full size topology settings are communicated by the client to the agent. Doing this allows the RDSH application, when it is later rendered on the local desktop 300, to be moved by the user to any part of the display screen and also to a different display screen that is connected to the user device on which the Horizon client is running.

FIG. 3B shows a connection window 308 displaying a message (e.g., such as connecting, loading, preparing, etc.) that is presented on the local desktop 300 as the connection to or session with the remote desktop at the agent side is being established. Typically, when a session with an RDSH application is requested, the graphics/window of the remote desktop is not streamed to the user device until after the user completes a logon process and the application is started. For example, the operating system (such as Microsoft Windows of Microsoft Corporation of Redmond, Wash.) at the remote host may implement a logon process for the user via a single sign on (SSO) authentication on a logon UI (logon screen).

Since SSO does not need user intervention after user credentials are entered, the entire logon process and/or the UI of the remote desktop can be hidden on the local desktop 300 from the user until after the SSO is completed and the RDSH application is started. Once the RDSH application is started, the display for the RDSH application is streamed by the client running on the user device, so as to present the RDSH application on the local desktop 300, while overlapping/hiding the rest of the local desktop 300 and/or without rendering the graphical frame of the remote desktop. This presentation configuration/layout gives the user an illusion that the RDSH application is running in isolation on the user/endpoint device.

However, if the administrator has configured some type of UI element such as a legal notice as part of the logon process, then the logon UI displays the UI element before the user is allowed to log on. FIG. 3C shows an example of a legal notice 310 that is presented on a logon UI 312 rendered on the local desktop 300. The legal notice 310 may comprise text, for instance, that provides a notification about copyright or other intellectual property rights, licensing terms, and/or other legal message that may need to be acknowledged by the user. Again and as previously explained above, the legal notice 310 is one type of UI element that may be presented in the logon UI or other type of UI and is used throughout this disclosure as one example of a UI element-embodiments of the techniques described herein may be applied to other types of UI elements that may (or may not) involve acknowledgement by the user. The logon UI 312 having the legal notice 310 displayed therein may be provided by a vendor or manufacturer of the OS for the remote desktop, and may be provided as part of the logon process (e.g., a Windows logon process) to access the remote desktop. In some situations, the logon UI 312 having the legal notice 310 may be provided as part of a logon process to access a particular RDSH application, a remote file, or some other resource accessible via the remote desktop. The logon UI 312 includes an acknowledgement button, such as an OK button 314, which can be clicked or otherwise activated by the user to acknowledge the legal notice 310 and to cause the legal notice 310 to disappear after clicking.

As shown in FIG. 3C, the logon UI 312 opens in windowless full-screen mode, and hence takes up all of the available topology on the local desktop 300. As such, the user is unable to view/use the icons 302 (local applications) and their related files on the local desktop 300 while the logon UI 312 is displayed. Furthermore and due to the legal notice 310 being displayed in full screen on the local desktop 300 of the primary display screen of the user device, all other display screens (e.g., one or more secondary display screens 316 connected to the user device) will also display a blank screen while the legal notice 310 is shown on primary display screen. Hence, if the user had open files/applications on the secondary screen(s) 316, such open applications/files will be obfuscated or otherwise non-viewable (as depicted by gray shading in FIG. 3C) due to the blanking of the secondary screen(s) 316 while the legal notice 310 is being shown on the primary display screen.

After the user clicks the OK button 314 to acknowledge the legal notice 310, the logon UI 312 continues to occupy all of the screens (e.g. the primary screen and secondary screen 316), with the secondary screen 316 continued to be blanked as shown in FIG. 3D. In various implementations after clicking the OK button 314, the logon process involves the logon UI 312 providing a sign-in window prompting the user to enter credentials 318 (such as a username and password). For example, clicking the OK button 314 will cause the legal notice to disappear from the logon UI 312, and a request for entry of the credentials 318 will then appear in its place on the sign-in window rendered by the logon UI 312, such as shown in FIG. 3D. The logon UI 312 may also display various logon status messages, such as Welcome, Preparing Desktop, etc. on the primary screen while the secondary screen(s) 316 display are blanked.

Once the logon process is completed (e.g., the user has clicked the OK button 314 and has successfully entered the credentials 318), then the logon UI 312 disappears from all of the display screens, including the un-blanking of the secondary screen 316. Then, the requested RDSH application launches in its default window size, and is rendered over a portion or all the local desktop 300, such that the RDSH application can be moved to any part of the primary display screen or moved to the secondary screen 316 (e.g., by clicking and dragging).

The user experience described above, in which the legal notice 310 fully occupies the primary display screen and all other secondary screens go blank, does not yield a good user experience. For instance, the user is interrupted with their tasks performed on open local application/files or is otherwise unable to view/use other applications and files when the screens are fully occupied by the logon UI or are blanked.

There may be implementations wherein the UI element such as the legal notice 310 is not set/configured by the system administrator, and so the UI element is not presented by the logon UI 312. As such, the client can hide (e.g., via the logon UI 312 shown in FIG. 3D) all of the UI elements of the remote desktop, until the RDSH application is opened, since there no further user input required after the credentials 318 are provided. However, in such an SSO-enabled scenario without a configured UI element such as the legal notice 310, as well as in an SSO-enabled scenario with a configured UI element such as the legal notice 310, the client still has to show the logon UI 312 to the user, in order to prompt the user to click the OK button 314 and/or to enter the credentials 318. Thus, the login UI 312 in both scenarios nevertheless still fully occupies the entire topology of the primary display screen and causes a blanking of the secondary screen 316.

One possible approach to address the foregoing issue(s) is for the manufacturer of the OS to add support in the OS so as provide/enable an application program interface (API) or other technique to resize the logon UI 312. However, getting the manufacturer's cooperation to modify or otherwise add support to existing OS products can be difficult.

The embodiments described herein are based on another approach. Specifically, the client software's (e.g., the Horizon client's) connection window, such as the window 308 in FIG. 3B, may be configured and opened with a relatively smaller topology size/setting (e.g., 800×600 pixels). Also, rather than communicating full/largest topology size of the display screens from the client to the agent when a connecting to the RDSH application, as was done above in FIGS. 3A-3D, the Horizon client informs the Horizon agent that the size of the primary and secondary display screens are also the same or similar smaller size (e.g., 800×600 pixels)—the true resolution/size of the display screens may not themselves actually be changed to the smaller size in some embodiments-rather the Horizon agent is just being informed that the size has been reduced.

With these size configurations, the logon UI 312 can only (fully) occupy the available topology, which is the smaller size to begin with. That is, the underlying code of the OS is itself not being changed since the logon UI is still fully occupying its screen/window—it is just that the size of the screen/window itself has been reduced from a first size (large or largest size) to a second size (relatively smaller size). Then, once the user acknowledges the legal notice 310 by clicking the OK button 312 and/or submits the credentials 318, the Horizon client can hide the connection window 308 and logon UI, and reset the topology to full screen on all display screens. Then, after the RDSH application is launched, the Horizon client can create another connection window, in which the RDSH application is displayed in normal size.

FIGS. 4A-4C are diagrams depicting example screenshots in connection with resizing a logon screen and a UI element such as a legal notice, such as explained above. Initially, the process may start such as depicted previously in FIG. 3A, wherein the Horizon client is launched, and a user selects one of the RDSH application icons 306 from the UI 304. Then in FIG. 4A, a smaller sized connection window 308 (e.g., 800×400 pixels) is generated, and the topology of the screen is also set to the same or similar smaller size, such that the subsequently rendered logon UI 312 fully occupies its smaller available topology.

As with previous FIG. 3C, the logon UI 312 of FIG. 4A also displays the legal notice 310 and the OK button 312, but at a smaller size due to the smaller screen of the logon UI 312. As shown in FIG. 4A, the smaller size of the logon UI 312 enables the other portions (e.g., local applications/files, taskbars, icons, etc.) of the local desktop 300 to be visible to and usable by the user. Moreover, FIG. 4A shows that the secondary display 316 is not fully blanked, such that a local application 400 that was/is currently running remains visible to and usable by the user. In some embodiments, a portion 402 of the secondary screen 316 may be blanked (depicted in gray shading) corresponding to the size of the display/window/screen for the reduced sized logon UI 312 rendered on the primary display screen. In other embodiments, the blanked portion 402 may not be present (e.g., the local application 400 is fully visible).

After the user has clicked the OK button 312 in FIG. 4A, the logon UI 312 prompts the user for the credentials 318 in FIG. 4B. The logon UI 312 in FIG. 4B fully occupies the same smaller topology, such that portions of the local desktop 300 are visible, as well as all or most of the contents of the secondary screen 316. The user may move (e.g., via click and drag mouse movements) the smaller sized logon UI 312 across the local desktop 300 in both FIGS. 4A and 4B, as well as moving the smaller sized logon UI to and within the secondary display screen 316.

After the user clicks the OK button 312 and/or submits the credentials 318, the Horizon client can reset the topology back to the full size topology and create a new connection window 404 (shown in FIG. 4C) in which the remote desktop and/or the launching RDSH application may be rendered. The connection window 404 may be full sized (e.g., a larger/normal size relative to the 800×400 pixel size in FIGS. 4A and 4B), and may overlap most or all of the local desktop 300.

One of the design considerations with the embodiments shown in FIGS. 4A-4C is the capability to accurately determine when the user has clicked the OK button 312. Accurately determining when this event has occurred enables the proper timing of the rendering of the sign-in window (requesting the credentials 318) and/or the resizing of the topology back to a larger/full size, so that the subsequent connection window 404 for the remote desktop and/or RDSH application can be generated on the user device with an appropriate size.

With some OS manufacturers, there are no supported techniques or APIs provided by their OS that specifically provide a notification to the remote desktop agent or client that the OK button 312 on the UI element such as the legal notice 310 has been clicked by the user. However and as an example, Microsoft provides an interface in Windows called IWRdsProtocolLogonErrorRedirector. This interface (or an analogous interface) is typically used by third party vendors to implement their own customized logon UI. This interface allows the vendors to receive callbacks when to start painting their own logon UI, or when the text on the logon UI needs to be changed, or if there are errors to be displayed during logon process (e.g., invalid credentials).

This interface provides a RedirectMessage( ) callback (or analogous interface and callback, such as VMRdsProtocolLogonErrorRedirector::RedirectStatus( ) that gives an application a callback when the text on the logon UI changes, and also provides a string pointer pointing to the message string (text). However, when the user clicks the OK button 312 on the UI element such as the legal notice 310, the message parameter received in RedirectMessage( ) callback is empty. Accordingly, the embodiments disclosed herein leverage and interpret the RedirectMessage callback with an empty message parameter as the signal that the OK button 314 has been clicked, and as a trigger to complete the logon process and to resize the topology back to the larger size. This process to use this or similar callback will be described in further detail later below.

Computing Environment

To further explain the details pertaining to resizing the logon UI 312 and a UI element such as the legal notice 310, reference is next made herein to FIG. 1, which is a schematic diagram illustrating an example virtualized computing environment 100 that can implement a virtual desktop infrastructure (VDI) with capability to resize a logon screen or a UI element prior to login. Depending on the desired implementation, virtualized computing environment 100 may include additional and/or alternative components than that shown in FIG. 1.

In the example in FIG. 1, the virtualized computing environment 100 includes multiple hosts, such as host-A 110A . . . host-N 110N that may be inter-connected via a physical network 112, such as represented in FIG. 1 by interconnecting arrows between the physical network 112 and host-A 110A . . . host-N 110N. Examples of the physical network 112 can include a wired network, a wireless network, the Internet, or other network types and also combinations of different networks and network types. For simplicity of explanation, the various components and features of the hosts will be described hereinafter in the context of the host-A 110A. Each of the other host-N 110N can include substantially similar elements and features.

The host-A 110A includes suitable hardware 114A and virtualization software (e.g., a hypervisor-A 116A) to support various virtual machines (VMs). For example, the host-A 110A supports VM1 118 . . . VMX 120, wherein X (as well as N) is an integer greater than or equal to 1. In practice, the virtualized computing environment 100 may include any number of hosts (also known as computing devices, host computers, host devices, physical servers, server systems, physical machines, etc.), wherein each host may be supporting tens or hundreds of virtual machines. For the sake of simplicity, the details of only the single VM1 118 are shown and described herein.

VM1 118 may be an agent-side VM that includes a guest operating system (OS) 122 and one or more guest applications 124 (and their corresponding processes) that run on top of the guest OS 122. The guest applications 124 may include RDSH applications, for example. Using the guest OS 122 and/or other resources of VM1 118 and the host-A 110A, VM1 118 may generate a remote desktop 126 (virtual desktop) that is operated by and accessible to one or more client-side user device(s) 146 (e.g., a client device or a local/endpoint device) via the physical network 112. One or more virtual printers 128 also may be instantiated in VM1 118 and/or elsewhere in the host-A 110A, and may correspond to one or more physical printers (not shown) at the user device 146. VM1 118 may include other elements, such as code and related data (including data structures), engines, etc. The user device 146 may include a display screen 148 and other components (explained in more detail in FIGS. 2 and 5A and 5B) to support the use of the user device 146 to operate the remote desktop 126 and other elements of VM1 118, such as providing the local desktop 300 that may present (in addition to local applications/files) full or reduce-sized windows, screens, displays, content, etc. associated with a remote desktop and its RDSH applications.

According to various embodiments, VM1 118 may operate as or have installed therein an agent that provides the remote desktop 126 (and other remote desktop features and functionality) to the user device 146. For instance, the agent may be a Horizon agent that can cooperate with client software (e.g., a Horizon client, installed at the user device 146) to establish and maintain a remote desktop connection between VM1 118 and the user device 146 for purposes of enabling the user to operate UIs on the display screen 148 in order to use the remote desktop 126. One or more connection servers can broker or otherwise manage communications between the agent (e.g., a Horizon agent) and the client software (e.g., a Horizon client) over a VDI connection 208 (shown in FIG. 2) provided by the physical network 112. A management server 142 and/or other server(s)/device(s) can operate as the connection server.

The hypervisor-A 116A may be a software layer or component that supports the execution of multiple virtualized computing instances. The hypervisor-A 116A may run on top of a host operating system (not shown) of the host-A 110A or may run directly on hardware 114A. The hypervisor 116A maintains a mapping between underlying hardware 114A and virtual resources (depicted as virtual hardware 130) allocated to VM1 118 and the other VMs. The hypervisor-A 116A may include other elements (shown generally at 140), including tools to provide resources for and to otherwise support the operation of the VMs.

Hardware 114A in turn includes suitable physical components, such as central processing unit(s) (CPU(s)) or processor(s) 132A; storage device(s) 134A; and other hardware 136A such as physical network interface controllers (NICs), storage disk(s) accessible via storage controller(s), etc. Virtual resources (e.g., the virtual hardware 130) are allocated to each virtual machine to support a guest operating system (OS) and application(s) in the virtual machine, such as the guest OS 122 and the application(s) 124 (e.g., a word processing application, accounting software, a browser, etc.) in VM1 118. Corresponding to the hardware 114A, the virtual hardware 130 may include a virtual CPU, a virtual memory (including agent-side caches used for print jobs for the virtual printers 128), a virtual disk, a virtual network interface controller (VNIC), etc.

The management server 142 of one embodiment can take the form of a physical computer with functionality to manage or otherwise control the operation of host-A 110A . . . host-N 110N. In some embodiments, the functionality of the management server 142 can be implemented in a virtual appliance, for example in the form of a single-purpose VM that may be run on one of the hosts in a cluster or on a host that is not in the cluster.

The management server 142 may be communicatively coupled to host-A 110A . . . host-N 110N (and hence communicatively coupled to the virtual machines, hypervisors, hardware, etc.) via the physical network 112. In some embodiments, the functionality of the management server 142 may be implemented in any of host-A 110A . . . host-N 110N, instead of being provided as a separate standalone device such as depicted in FIG. 1.

Depending on various implementations, one or more of the physical network 112, the management server 142, and the user device(s) 146 can comprise parts of the virtualized computing environment 100, or one or more of these elements can be external to the virtualized computing environment 100 and configured to be communicatively coupled to the virtualized computing environment 100.

Figure 2:
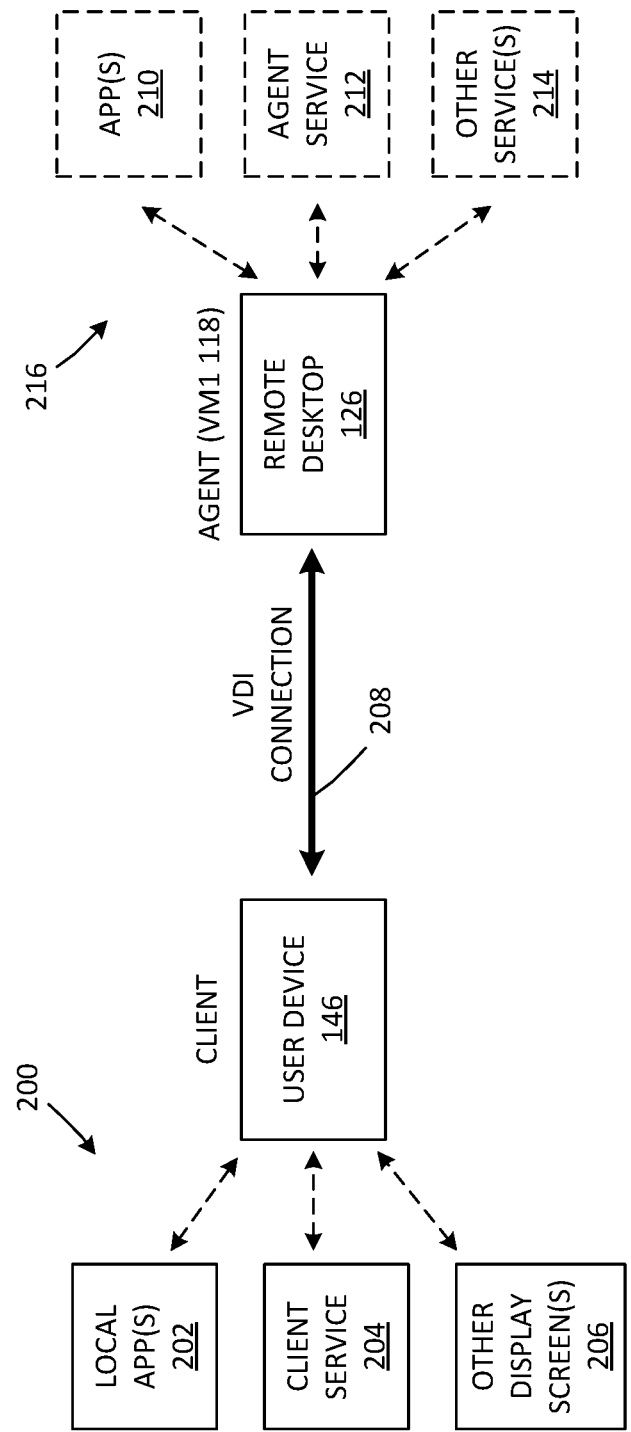
FIG. 2 is a schematic diagram illustrating some example client-side and agent-side components for the virtualized computing environment of FIG. 1.

FIG. 2 is a schematic diagram illustrating some example client-side and agent-side components for the virtualized computing environment 100 of FIG. 1. More specifically, FIG. 2 shows client-side components 200 (e.g., components running on or operatively coupled to the user device 146), and agent-side components 216 (e.g., the VM1 118 that provides the remote desktop 126 and which runs on a host).

For the client-side components 200, the user device 146 may have (in addition to the display screen 148 shown in FIG. 1) local applications (APPs) 202 installed on it. One of the local applications 202 or some other software at the user device 146 may be a client service 204 (e.g., a Horizon client or other remote desktop client software or code). The user device 146 may be coupled to one or more other display screens 206, such as the secondary display screen 316 previously described above, so as to provide the user device 146 with the benefit of primary and secondary display screens.

For the agent-side components 216, the remote desktop 126 may provide RDSH applications 210 installed/running thereon (e.g., the applications 124 of FIG. 1). These RDSH applications 210 (e.g., their respective icons or launched files/interfaces) may in turn be presented on a window/screen/display of the remote desktop 126 rendered on the display screen of the user device 146, when the user device 146 accesses the remote desktop 126, such as shown by the window 404 described above with respect to FIG. 4C.

VM1 118 that provides the remote desktop 126 may also have installed therein an agent service 212 (e.g., a Horizon agent or other remote desktop agent software or code) and other code generally depicted in FIG. 2 as other services 214. For example, the other services 214 may include an rdeServer provided by VMware, Inc. or other type of service to act as an interface between the agent service 212 and the client service 204 (and/or other components) via the VDI connection 208.

Resizing Workflow(s)

Figure 5A:
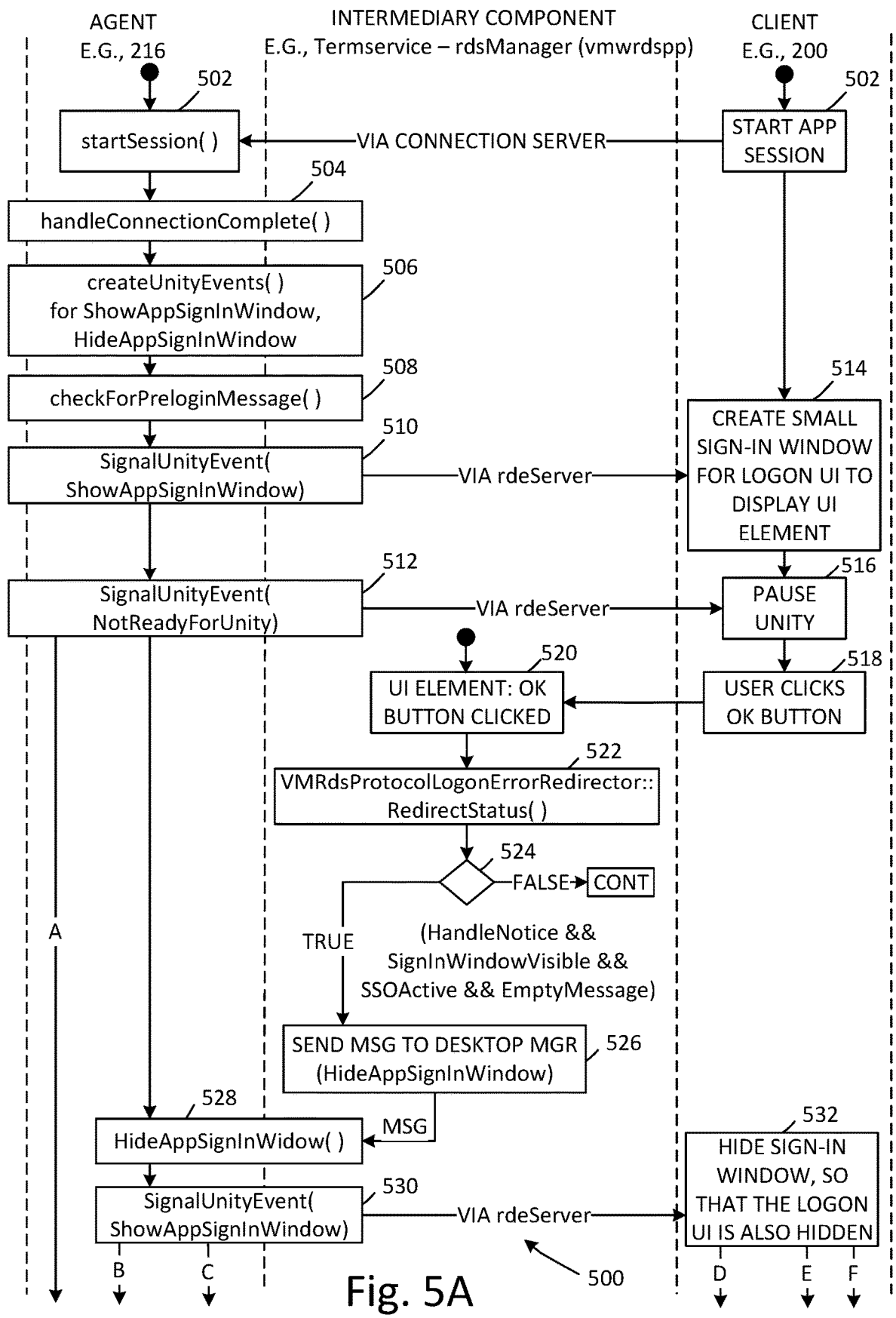
FIGS. 5A and 5B is a flow diagram of an example method to perform resizing of a logon UI and a UI element.
Figure 5B:
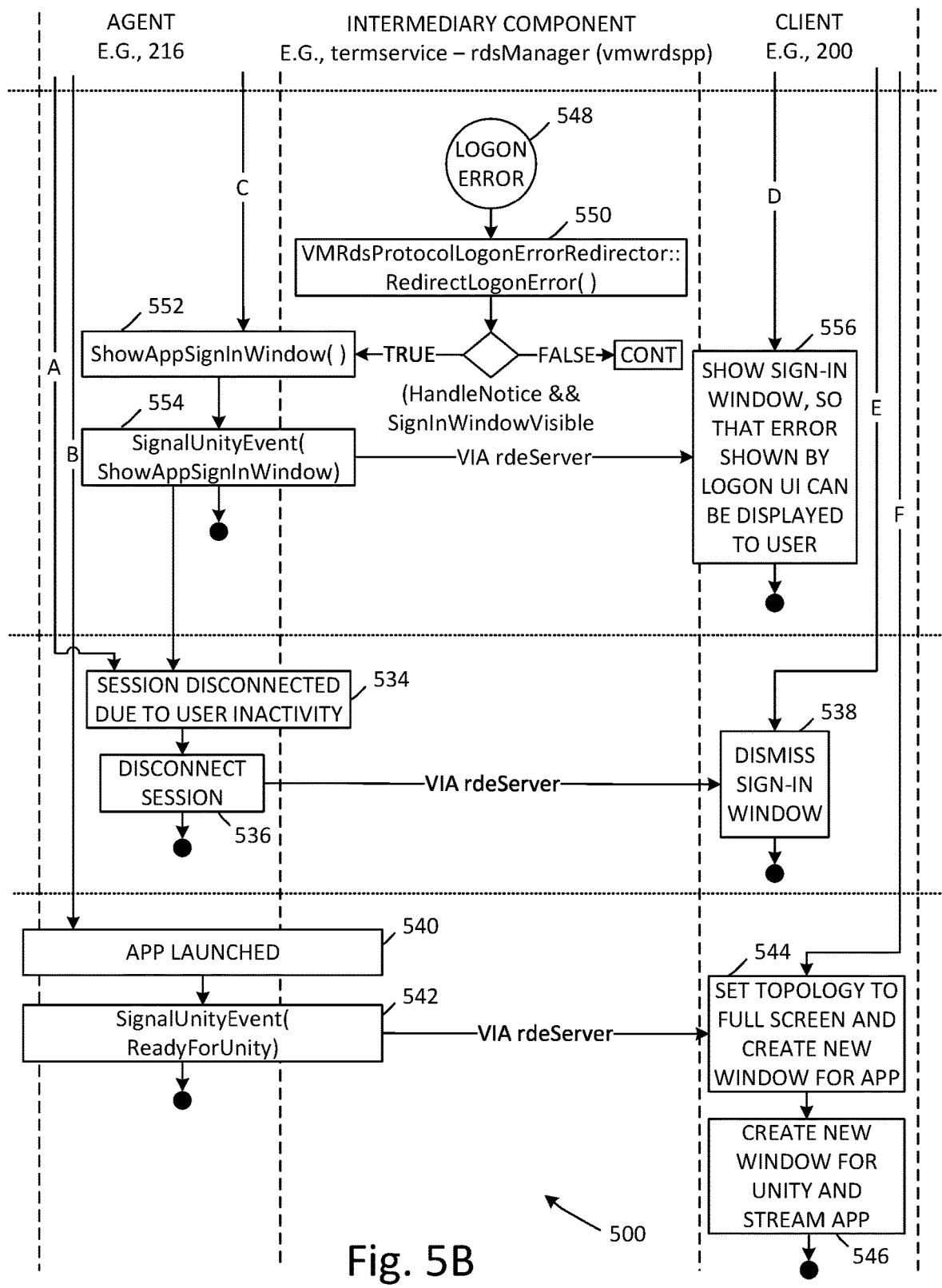

Based on the foregoing description of the UIs and agent-side and client-side components in a VDI implementation in the virtualized computing environment 100, reference now is made to FIGS. 5A and 5B that show how the various components cooperate to present resized UIs and other content. More specifically, FIG. 5 is a flow diagram of an example method 500 to perform a resizing of the logon UI 312 and a UI element such as the legal notice 310. Example method 500 may include one or more operations, functions, or actions illustrated at 502 to 556. The various operations of the method 500 and/or of any other process(es) described herein may be combined into fewer operations, divided into additional operations, supplemented with further operations, and/or eliminated based upon the desired implementation.

In one embodiment, the operations of the method 500 and/or of any other process(es) described herein may be performed in a pipelined sequential manner. In other embodiments, some operations may be performed out-of-order, in parallel, etc.

According to one embodiment, the method 500 may be performed by the client-side components 200 and the agent-side components 216, in cooperation with other components (such as OS components or other VDI-related components). In other embodiments, various other elements in a computing environment may perform, individually or cooperatively, the various operations of the method 500.

Furthermore, the method 500 will be described herein using various specific notations, labels, syntax, string formats, or other nomenclature for events, components, signals, instructions, messages, etc., such as Windows-based nomenclature or vendor/manufacturer-based nomenclature It is understood that such nomenclature used to describe the method 500 and other processes/components in this disclosure are merely for convenience for purposes of identification and reference, and are not intended to restrict the embodiments to the specific implementations/products corresponding to the nomenclature being used. For instance, a Windows-based nomenclature may be used to describe a particular message, and it is understood that various embodiments that provide a message with similar functionality may use a completely different nomenclature.

At 502 ("START APP SESSION"), the user selects a particular RSDH application from a pool of applications presented in the UI 304 of the client (see, e.g., FIG. 3A above), and opens/clicks on the application's icon to open it and to request a connection so as to start a remote desktop session, such as a Windows session.

The connection server establishes the VDI connection 208 (see, e.g., FIG. 2 above), with the agent service 212 running on VM1 118 receiving the connection request and starting a session at 504 ("startSession( )"). VM1 118 also runs another component, such as the rdeServer, alongside the agent service 212. The agent service 212 and the rdeServer communicate via some named events that are created per Windows session. When the connection 208 is completed at 504 ("handleConnectionComplete( )"), the agent service 212 creates multiple named Windows events at 506, such as: NotReadyForUnity, ShowAppSignInWindow, HideAppSignInWindow, ReadyForUnity, etc. for the Windows session. Unity as used herein may refer to the Unity product available from VMware, Inc., or other analogous product, that is usable to show display windows of RDSH applications at the user device 146, with or without the accompanying graphical frames of the remote desktop.

The agent service 212 may also check for any pre-login messages, at 508 ("checkForPreloginMessage( )").

If a UI element such as the legal notice 310 is configured by the system administrator, the agent service 212 signals the events ShowAppSignInWindow and NotReadyForUnity, respectively at 510 and 512. When the ShowAppSignInWindow event is signaled, the rdeServer informs the client (which is running on the user device 146) to create a small sign-in window for showing the logon UI 312. Due to the ShowAppSignInWindow event, the client creates a sign-in window of a small size that was configured, such as 800× 600 pixels, at 514 ("CREATE SMALL SIGN-IN WINDOW FOR LOGON UI TO DISPLAY UI ELEMENT"). The logon UI 312 is where a UI element such as the legal notice 314 will also be displayed, as previously described above in FIGS. 3C and 4A. If contents of the legal notice 310 is too large to fit in the window, the login UI 312 may automatically add scroll bars to the legal notice 310 so as to maintain the small size while still enabling the user to view the contents of the legal notice 310 in its entirety.

The event NotReadyForUnity tells the rdeServer that the client should show the entire display (e.g., the full graphical frame of the remote desktop) for VM1 118 from which the user is requesting the session, rather than just the window of the requested RSDH application, at a block 516 ("PAUSE UNITY").

A remote desktop services (RDS) service (e.g., termservice) on the agent loads a plugin such as rdsManager (vmwrdspp.dll) that implement the interfaces such as IWTSProtocolConnection and IWTSProtocolLogonErrorRedirector. When the connection is initiated, the rdsManager can inform the RDS service via VMRdsProtocolConnection::GetClientMonitorData( ) to set the display resolution to a default 800×600 pixels or other small size setting to match the display setting at the client. The login UI 312 will load into this console/window. Since the topology of this window is small, the login UI 312 (which takes up the entire topology) will load into this small window. Hence, the legal notice 310 will also be displayed in this small window.

The user acknowledges the legal notice 310 by clicking the OK button 314 on the legal notice 310, at 518 ("USER CLICKS OK BUTTON"). In some embodiments, the user also enters credentials 318 into the sign-in window. The clicking of the OK button 314 leads to a call into VMRdsProtocolLogonErrorRedirector::RedirectStatus( ) with an empty message parameter, at 520-524. This empty message parameter is used as an indication that the legal notice 310 was acknowledged and clicked/dismissed by the user. The rdsManager informs the agent about this event, and the agent can then signal the HideAppSignInWindow event, at 526-530. The rdeServer can then inform the client running on the user device 146 to hide the sign-in window in which the logon UI 312 and the legal notice 310 were being displayed, at 532 ("HIDE SIGN-IN WINDOW, SO THAT THE LOGON UI IS ALSO HIDDEN").

The method 500 of FIG. 5A continues into FIG. 5B, via connection points shown at A, B, C, D, E, and F in these figures. FIG. 5B illustrates three alternative scenarios (separated by horizontal dashed lines) and corresponding operations that may occur.

In FIG. 5B, if the user does not respond to the legal notice 310 or requested credentials 318, etc. in a fixed time, then the logon UI 312 times out and exits. In this case the session is disconnected, and the client destroys/dismisses the sign-in window. These operations are shown at 534-538.

If the logon is successfully finished and when the agent starts/launches the requested application, the agent signals the event ReadyForUnity to the client. These operations are shown at 540 and 542 in FIG. 5B. The rdeServer forwards the event to the client running on the user device 146. The client can then create a new connection window with the full topology including all the display screens connected to the user device 146, and associates the connection window with the user session, at 544 ("SET TOPOLOGY TO FULL SCREEN AND CREATE NEW WINDOW FOR APP"). The launched application may start in a seamless Unity mode (e.g., in a window without the graphical frames of the remote desktop) and gets streamed in this window, at 546 ("CREATE NEW WINDOW FOR UNITY AND STREAM APP"). The user may then commence with using the application.

In implementations wherein the legal notice 310 is not set by the system administrator, the new sign in window need not be created and the existing Unity/application window may be started directly, such that the user will see the application. If there is an error in logon or if SSO is not active, then the logon UI 312 may be displayed by the previous VDI window instead of displaying the seamless window or other window. The logon error detection and error handling are shown at 548-556 in FIG. 5B.

Computing Device

The above examples can be implemented by hardware (including hardware logic circuitry), software or firmware or a combination thereof. The above examples may be implemented by any suitable computing device, computer system, etc. The computing device may include processor(s), memory unit(s) and physical NIC(s) that may communicate with each other via a communication bus, etc. The computing device may include a non-transitory computer-readable medium having stored thereon instructions or program code that, in response to execution by the processor, cause the processor to perform processes described herein with reference to FIGS. 1-5B. For example, computing devices capable of acting as agent-side host devices or client-side user devices may be deployed in or otherwise operate in conjunction with the virtualized computing environment 100.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

Although examples of the present disclosure refer to "virtual machines," it should be understood that a virtual machine running within a host is merely one example of a "virtualized computing instance" or "workload." A virtualized computing instance may represent an addressable data compute node or isolated user space instance. In practice, any suitable technology may be used to provide isolated user space instances, not just hardware virtualization. Other virtualized computing instances (VCIs) may include containers (e.g., running on top of a host operating system without the need for a hypervisor or separate operating system; or implemented as an operating system level virtualization), virtual private servers, client computers, etc. The virtual machines may also be complete computation environments, containing virtual equivalents of the hardware and system software components of a physical computing system. Moreover, some embodiments may be implemented in other types of computing environments (which may not necessarily involve a virtualized computing environment), wherein it would be beneficial to perform a resizing of a logon screen or other UI element(s).

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood that each function and/or operation within such block diagrams, flowcharts, or examples can be implemented, individually and/or collectively, by a wide range of hardware, software, firmware, or any combination thereof.

Some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware are possible in light of this disclosure.

Software and/or other instructions to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non-recordable media (e.g., read-only memory (ROM), random access memory (RAM), magnetic disk or optical storage media, flash memory devices, solid-state drive, etc.).

The drawings are only illustrations of an example, wherein the units or procedure shown in the drawings are not necessarily essential for implementing the present disclosure. The units in the device in the examples can be arranged in the device in the examples as described, or can be alternatively located in one or more devices different from that in the examples. The units in the examples described can be combined into one module or further divided into a plurality of sub-units.

We claim:

1. A method to resize user interfaces (UIs) of a remote desktop, the method comprising:
   reducing a size of a first window of a logon UI for the remote desktop from a first size to a second size that is smaller than the first size, wherein the logon UI fully occupies the first window, and wherein the first size corresponds to a size of a primary display screen of a user device;
   presenting a UI element in the first window, having the second size, of the logon UI along with an acknowledgement button;
   rendering the first window, having the second size and the UI element and acknowledgment button presented therein, of the logon UI on the primary display screen, such that the rendered first window occupies less than all of the primary display screen and such that a secondary display screen of the user device continues to present content;
   determining that the acknowledgement button of the UI element has been activated; and
   in response to determination that the acknowledgement button has been activated, dismissing the logon UI and changing a size for a second window, of an application available from the remote desktop, from the second size to the first size.

2. The method of claim 1, wherein determining that the acknowledgement button of the UI element has been activated comprises detecting a callback message having an empty message parameter.

3. The method of claim 1, further comprising:
   presenting a prompt for credentials in a sign-in window rendered on the logon UI having the second size, wherein the prompt is presented after activation of the acknowledgement button, and wherein dismissing the logon UI includes dismissing the logon UI after validation of the credentials.

4. The method of claim 1, wherein:
   the secondary display screen is fully blanked if the first window of the logon UI is presented on the primary display screen in the first size, and
   while the secondary display screen continues to present content if the first window of the logon UI is presented on the primary display screen in the second size, a portion, of the secondary display screen, having the second size is blanked.

5. The method of claim 1, wherein the rendered first window, having the second size, of the logon UI is movable within the primary display screen, and also to and within the secondary display screen.

6. The method of claim 1, wherein reducing the size of the first window of the logon UI comprises reducing the size of the first window in response to a communication of a reduced resolution of the primary display screen of the user device, and wherein an actual resolution of the primary display screen is unchanged.

7. The method of claim 1, wherein activation of the acknowledgement button comprises a click of an OK button.

8. A non-transitory computer-readable medium having instructions stored thereon, which in response to execution by one or more processors, cause the one or more processors to perform a method to resize user interfaces (UIs) of a remote desktop, wherein the method comprises:
   reducing a size of a first window of a logon UI for the remote desktop from a first size to a second size that is smaller than the first size, wherein the logon UI fully occupies the first window, and wherein the first size corresponds to a size of a primary display screen of a user device;
   presenting a UI element in the first window, having the second size, of the logon UI along with an acknowledgement button;
   rendering the first window, having the second size and the UI element and acknowledgment button presented therein, of the logon UI on the primary display screen, such that the rendered first window occupies less than all of the primary display screen and such that a secondary display screen of the user device continues to present content;
   determining that the acknowledgement button of the UI element has been activated; and
   in response to determination that the acknowledgement button has been activated, dismissing the logon UI and changing a size for a second window, of an application available from the remote desktop, from the second size to the first size.

9. The non-transitory computer-readable medium of claim 8, wherein determining that the acknowledgement button of the UI element has been activated comprises detecting a callback message having an empty message parameter.

10. The non-transitory computer-readable medium of claim 8, wherein the method further comprises:
    presenting a prompt for credentials in a sign-in window rendered on the logon UI having the second size, wherein the prompt is presented after activation of the acknowledgement button, and wherein dismissing the logon UI includes dismissing the logon UI after validation of the credentials.

11. The non-transitory computer-readable medium of claim 8, wherein:
    the secondary display screen is fully blanked if the first window of the logon UI is presented on the primary display screen in the first size, and while the secondary display screen continues to present content if the first window of the logon UI is presented on the primary display screen in the second size, a portion, of the secondary display screen, having the second size is blanked.

12. The non-transitory computer-readable medium of claim 8, wherein the rendered first window, having the second size, of the logon UI is movable within the primary display screen, and also to and within the secondary display screen.

13. The non-transitory computer-readable medium of claim 8, wherein reducing the size of the first window of the logon UI comprises reducing the size of the first window in response to a communication of a reduced resolution of the primary display screen of the user device, and wherein an actual resolution of the primary display screen is unchanged.

14. The non-transitory computer-readable medium of claim 8, wherein activation of the acknowledgement button comprises a click of an OK button.

15. A computer, comprising:
a processor; and
a non-transitory computer-readable medium coupled to the processor and having instructions stored thereon, which in response to execution by the processor, cause the processor to perform operations to resize user interfaces (UIs) of a remote desktop, wherein the operations comprise:
reduce a size of a first window of a logon UI for the remote desktop from a first size to a second size that is smaller than the first size, wherein the logon UI fully occupies the first window, and wherein the first size corresponds to a size of a primary display screen of a user device;
present a UI element in the first window, having the second size, of the logon UI along with an acknowledgement button;
render the first window, having the second size and the UI element and acknowledgment button presented therein, of the logon UI on the primary display screen, such that the rendered first window occupies less than all of the primary display screen and such that a secondary display screen of the user device continues to present content;
determine that the acknowledgement button of the UI element has been activated; and
in response to determination that the acknowledgement button has been activated, dismiss the logon UI and change a size for a second window, of an application available from the remote desktop, from the second size to the first size.

16. The computer of claim 15, wherein the operations to determine that the acknowledgement button of the UI element has been activated comprise operations that to detect a callback message having an empty message parameter.

17. The computer of claim 15, wherein the operations further comprise:
present a prompt for credentials in a sign-in window rendered on the logon UI having the second size, wherein the prompt is presented after activation of the acknowledgement button, and wherein dismissing the logon UI includes dismissing the logon UI after validation of the credentials.

18. The computer of claim 15, wherein:
the secondary display screen is fully blanked if the first window of the logon UI is presented on the primary display screen in the first size, and
while the secondary display screen continues to present content if the first window of the logon UI is presented on the primary display screen in the second size, a portion, of the secondary display screen, having the second size is blanked.

19. The computer of claim 15, wherein the rendered first window, having the second size, of the logon UI is movable within the primary display screen, and also to and within the secondary display screen.

20. The computer of claim 15, wherein the operations to reduce the size of the first window of the logon UI comprise operations to reduce the size of the first window in response to a communication of a reduced resolution of the primary display screen of the user device, and wherein an actual resolution of the primary display screen is unchanged.

21. The computer of claim 15, wherein activation of the acknowledgement button comprises a click of an OK button.

* * * * *